United States Patent
Rajeev

(10) Patent No.: US 9,822,808 B2
(45) Date of Patent: Nov. 21, 2017

(54) PENETRATED FLOATING NUT

(71) Applicant: MITSUBISHI AIRCRAFT CORPORATION, Aichi (JP)

(72) Inventor: Bachhao Rajeev, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 8 days.

(21) Appl. No.: 15/011,010

(22) Filed: Jan. 29, 2016

(65) Prior Publication Data

US 2016/0245318 A1    Aug. 25, 2016

(30) Foreign Application Priority Data

Feb. 19, 2015    (JP) .................................. 2015-030150

(51) Int. Cl.
*F16B 39/00*    (2006.01)
*F16B 5/01*    (2006.01)
(Continued)

(52) U.S. Cl.
CPC .............. *F16B 5/01* (2013.01); *F16B 37/044* (2013.01); *F16B 5/0225* (2013.01)

(58) Field of Classification Search
CPC ........ F16B 5/01; F16B 37/044; F16B 5/0283; F16B 5/0275
(Continued)

(56) References Cited

U.S. PATENT DOCUMENTS 3,339,609 A     9/1967  Cushman
4,973,208 A *  11/1990  Gauron .................. B29C 70/68
                                                    411/258
(Continued)

FOREIGN PATENT DOCUMENTS

JP    H08-300525 A    11/1996
JP    2013-113391 A    6/2013

OTHER PUBLICATIONS

Extended European Search Report issued in application No. EP 15202574 dated Jun. 23, 2016.

*Primary Examiner* — Gary Estremsky
(74) *Attorney, Agent, or Firm* — Pearne & Gordon LLP

(57) ABSTRACT

A penetrated floating nut includes: a first retaining member including a cylindrical first cylindrical section and a first flange section provided at one end portion of the first cylindrical section; a second retaining member including a cylindrical second cylindrical section and a second flange section provided at one end portion of the second cylindrical section, the second cylindrical section being joined to the first cylindrical section of the first retaining member; and a nut housed in the first cylindrical section of the first retaining member with a gap therebetween and including a third flange section at one end portion of the nut and further including rotation stopping means between the nut and the first cylindrical section of the first retaining member, the third flange section being housed in the second cylindrical section of the second retaining member with a gap therebetween and being capable of contacting an end surface of the first cylindrical section of the first retaining member. A bolt fastened to the nut is capable of penetrating through the penetrated floating nut from the first retaining member side to the second retaining member side.

6 Claims, 4 Drawing Sheets

(51) Int. Cl.
*F16B 37/04* (2006.01)
*F16B 5/02* (2006.01)

(58) Field of Classification Search
USPC .......................................................... 411/166
See application file for complete search history.

(56) References Cited

U.S. PATENT DOCUMENTS

| | | | | |
|---|---|---|---|---|
| 4,981,735 | A * | 1/1991 | Rickson | F16B 5/01 156/92 |
| 5,066,180 | A * | 11/1991 | Lang | F16B 37/122 411/103 |
| 5,314,144 | A * | 5/1994 | Porter, Jr. | F16B 5/0208 244/119 |
| 5,534,031 | A * | 7/1996 | Matsuzaki | A61F 2/446 411/166 |
| 5,632,582 | A * | 5/1997 | Gauron | F16B 5/01 411/108 |
| 6,183,180 | B1 * | 2/2001 | Copple | F16B 37/044 411/107 |
| 6,238,123 | B1 * | 5/2001 | Schwarzbich | F16B 5/0233 403/12 |
| 6,264,412 | B1 * | 7/2001 | Nakamura | F16B 5/01 411/107 |
| 6,360,842 | B1 * | 3/2002 | Combest | H04R 1/026 181/150 |
| 6,708,637 | B1 * | 3/2004 | Webster | B63B 5/08 114/65 R |
| 7,516,534 | B2 * | 4/2009 | Easterbrook | B21J 15/02 29/509 |
| 7,588,386 | B2 * | 9/2009 | Kielczewski | F16B 5/0233 248/188.4 |
| 2007/0297869 | A1 | 12/2007 | Kunda | |

* cited by examiner

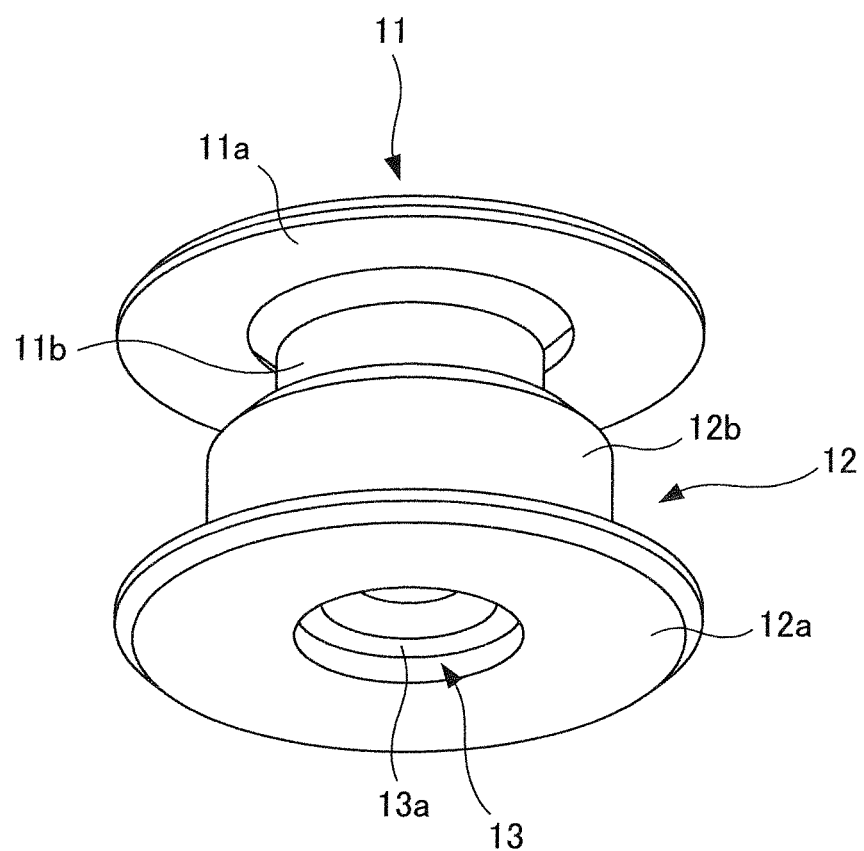

PENETRATED FLOATING NUT

TECHNICAL FIELD

The present invention relates to a penetrated floating nut through which a bolt for fastening can penetrate.

BACKGROUND ART

A honeycomb sandwich panel as disclosed for example in Patent Literature 1 listed below is sometimes used for the floors of the cabin and the luggage compartment of an aircraft. This honeycomb sandwich panel is a panel obtained by fixedly attaching a honeycomb layer which is a collection of hexagonal cells or hexagonal prism cells and honeycomb skin layers which are laid on the upper and lower surfaces of the honeycomb layer. The honeycomb skin layers are made for example of carbon fiber-reinforced plastic (CFRP) or the like.

The honeycomb sandwich panel is light and rigid. When it is used, its thickness is often reduced as much as possible while its strength is taken into account to thereby achieve a further weight reduction.

CITATION LIST

Patent Literatures

{Patent Literature 1}
Japanese Patent Application Publication No. Hei 8-300525
{Patent Literature 2}
Japanese Patent Application Publication No. 2013-113391

SUMMARY OF INVENTION

Technical Problems

A floating nut as disclosed for example in Patent Literature 2 listed above is one of the nuts that are generally used when high accuracy is not required. The floating nut includes a nut part whose movement is limited in the axial direction but permitted in directions perpendicular to the axial direction, thereby allowing easy mounting. However, the floating nut as disclosed in Patent Literature 2 is mounted to a target panel from its back side and it will therefore be difficult to mount the floating nut if a structural object is present on the back side of the panel.

Meanwhile, there is also a non-penetrated floating nut (buried floating nut) which is buried in a target panel. By using this buried, non-penetrated structure, the floating nut can be mounted regardless of whether a structural object is present on the back side of the target panel.

Here, FIG. 4 is a cross-sectional view illustrating a case of using the buried, non-penetrated floating nut for the thin honeycomb sandwich panel mentioned above.

As shown in FIG. 4, for example, in the case of using the buried, non-penetrated floating nut for a honeycomb sandwich panel 100, a hole 103 is formed whose bottom surface is situated around the boundary of a honeycomb layer 101 and a honeycomb skin layer 102. The buried, non-penetrated floating nut is provided in the hole 103 and includes a cap 105 fixed to the wall surface of the hole 103 by a sealant 104, a nut 108 provided in the cap 105 in such a way as to leave a space therein and be capable of moving within predetermined ranges, and a sleeve 106 provided in an upper section of the hole 103. Inside the honeycomb sandwich panel 100, a bolt 107 passes through the sleeve 106 and is screwed into the nut 108.

In the case of using this conventional buried, non-penetrated floating nut for the thin honeycomb sandwich panel mentioned above, the total thickness of the cap 105, the sealant 104, and the honeycomb skin layer 102 is large. Hence, the height of the nut part cannot be sufficient, which leads to insufficient fixing in some cases.

The present invention has been made in view of the above technical circumstances and an objective thereof is to provide a buried and penetrated floating nut which is buried in a target panel and through which a bolt penetrates, to thereby solve the above problems and thus enable secure fixing of a target object even in an area inside an aircraft or the like where the arrangement of structural objects is limited and a sufficient space is not provided, and broaden the range of application of the floating nut to enhance its usability.

Solution to Problems

A penetrated floating nut according to a first aspect for solving the above problems is a penetrated floating nut, including:
- a first retaining member including a cylindrical first cylindrical section and a first flange section provided at one end portion of the first cylindrical section;
- a second retaining member including a cylindrical second cylindrical section and a second flange section provided at one end portion of the second cylindrical section, the second cylindrical section being joined to the first cylindrical section of the first retaining member; and
- a nut housed in the first cylindrical section of the first retaining member with a gap therebetween and including a third flange section at one end portion of the nut and further including rotation stopping means between the nut and the first cylindrical section of the first retaining member, the third flange section being housed in the second cylindrical section of the second retaining member with a gap therebetween and being capable of contacting an end surface of the first cylindrical section of the first retaining member, in which
- a bolt fastened to the nut is capable of penetrating through the penetrated floating nut from the first retaining member side to the second retaining member side.

A penetrated floating nut according to a second aspect for solving the above problems is the penetrated floating nut according to the first aspect in which the rotation stopping means permits the nut to move relative to the first retaining member in an axial direction and directions perpendicular thereto within predetermined ranges.

A penetrated floating nut according to a third aspect for solving the above problems is the penetrated floating nut according to the first aspect in which the second flange section is formed at one end of the second cylindrical section to extend radially inward and supports the third flange section when the bolt is not fastened.

A penetrated floating nut according to a fourth aspect for solving the above problems is the penetrated floating nut according to the first aspect in which an adhesive filling recess in which to fill an adhesive is formed in an inner wall of the first cylindrical section.

Advantageous Effects of Invention

According to the penetrated floating nut according to the first aspect, the penetrated floating nut includes: the first retaining member including the cylindrical first cylindrical section and the first flange section provided at the one end portion of the first cylindrical section; the second retaining member including the cylindrical second cylindrical section and the second flange section provided at the one end portion of the second cylindrical section, the second cylindrical section being joined to the first cylindrical section of the first retaining member; and the nut housed in the first cylindrical section of the first retaining member with a gap therebetween and including the third flange section at the one end portion of the nut and further including the rotation stopping means between the nut and the first cylindrical section of the first retaining member, the third flange section being housed in the second cylindrical section of the second retaining member with a gap therebetween and being capable of contacting the end surface of the first cylindrical section of the first retaining member. Also, the bolt fastened to the nut is capable of penetrating through the penetrated floating nut from the first retaining member side to the second retaining member side. In this way, the height of the nut can be large and therefore the penetrated floating nut can be applied to a thin panel. Further, even when a structural object is present on the backside of the panel, the penetrated floating nut can be mounted without difficulty. Furthermore, when no structural object is present on the back side of the panel, the fastener can be made long and the fastener can therefore be selected with a greater degree of freedom.

According to the penetrated floating nut according the second aspect, in the penetrated floating nut according to the first aspect, the rotation stopping means permits the nut to move relative to the first retaining member in the axial direction and directions perpendicular thereto within predetermined ranges. In this way, rotation of the nut can be stopped during the fastening of the bolt.

According to the penetrated floating nut according the third aspect, in the penetrated floating nut according to the first aspect, the second flange section is formed at the one end of the second cylindrical section to extend radially outward and supports the third flange section when the bolt is not fastened. In this way, the nut is unlikely to fall off.

According to the penetrated floating nut according the fourth aspect, in the penetrated floating nut according to the first aspect, the recess in which to fill an adhesive is formed in the inner wall of the first cylindrical section. In this way, the adhesive can be prevented from leaking downward.

BRIEF DESCRIPTION OF DRAWINGS

FIG. 2 is a perspective view explaining the arrangement of an upper-side retaining member, a lower-side retaining member, and a nut.

FIGS. 3A to 3C are views explaining the arrangement of the upper-side retaining member and the nut, FIG. 3A being a perspective view, FIG. 3B being a bottom view, FIG. 3C being a view seen in the direction of arrows a.

DESCRIPTION OF EMBODIMENT

A penetrated floating nut according to the present invention will be explained below through an embodiment with reference to the drawings.

Embodiment 1

The structure of a penetrated floating nut according to Embodiment 1 of the present invention will be explained with reference to FIGS. 1 to 3C.

The penetrated floating nut according to Embodiment 1 of the present invention is designed to be used for bolting an aircraft's floor (floor panel) and is a buried and penetrated floating nut which is buried in the target panel and through which a bolt penetrates. In this way, the height of a nut in the floating nut can be large and therefore the floating nut can be applied to a thin panel. Further, even when a structural object is present on the back side of the panel, the penetrated floating nut can be mounted without difficulty. Furthermore, when no structural object is present on the back side of the panel, the fastener can be made long and the fastener can therefore be selected with a greater degree of freedom.

Figure 1:
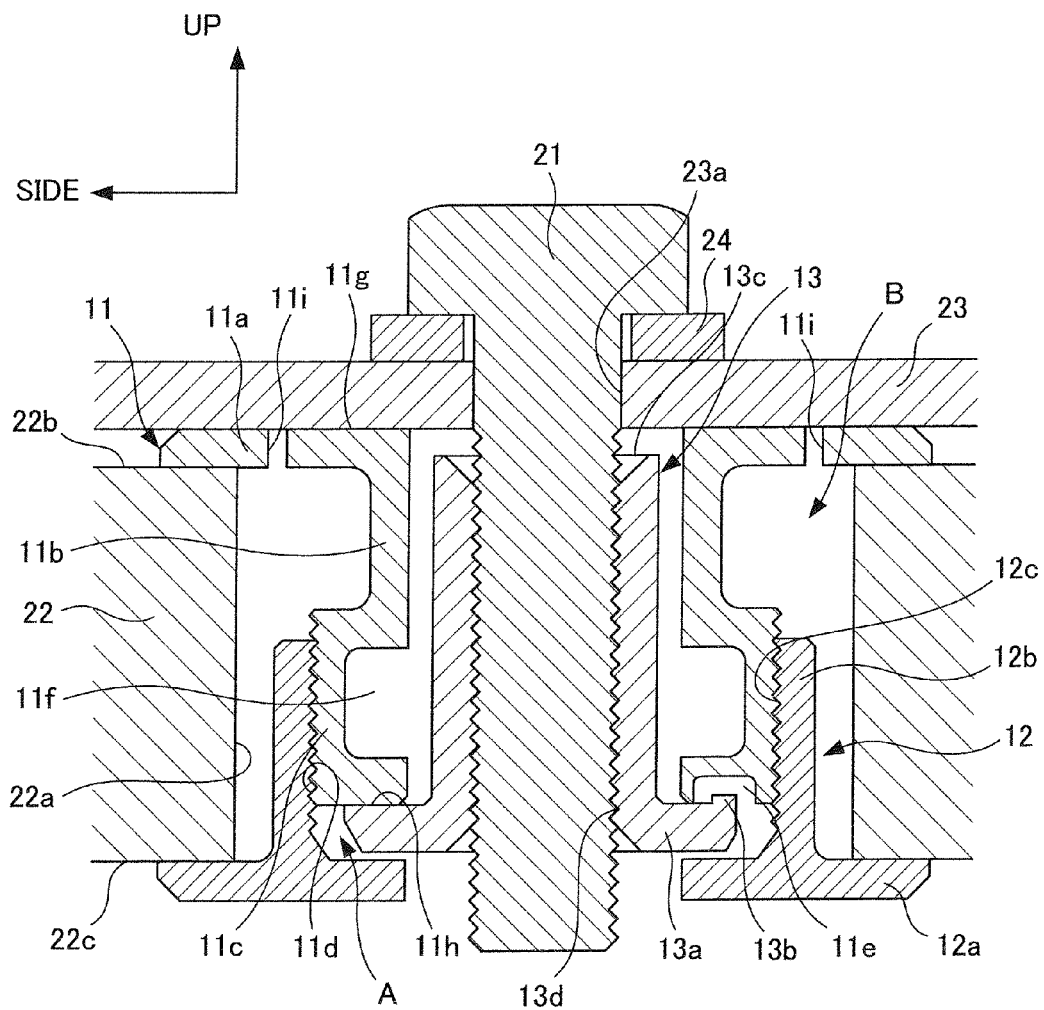
FIG. 1 is a cross-sectional view explaining a penetrated floating nut according to Embodiment 1 of the present invention.
Figure 3A:
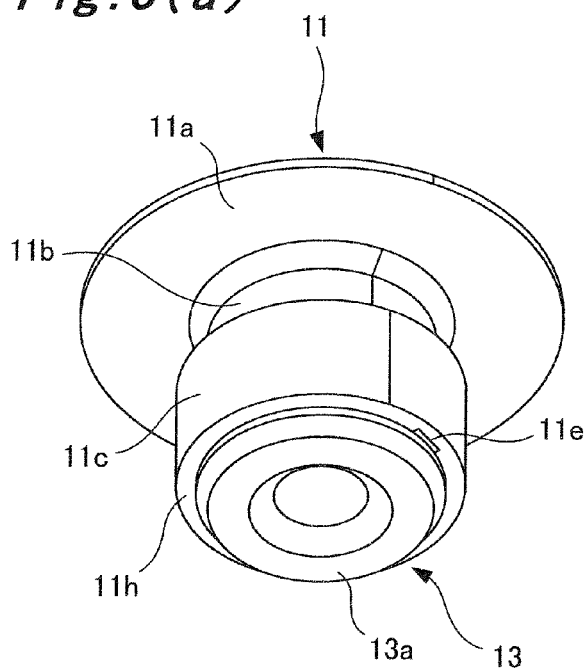
Figure 3B:
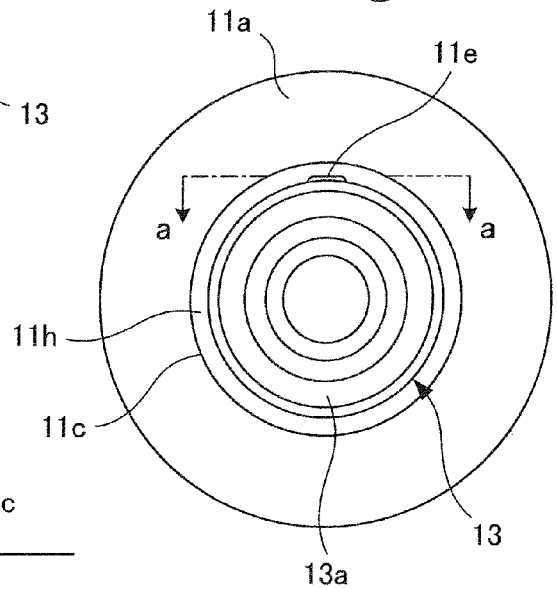
Figure 3C:
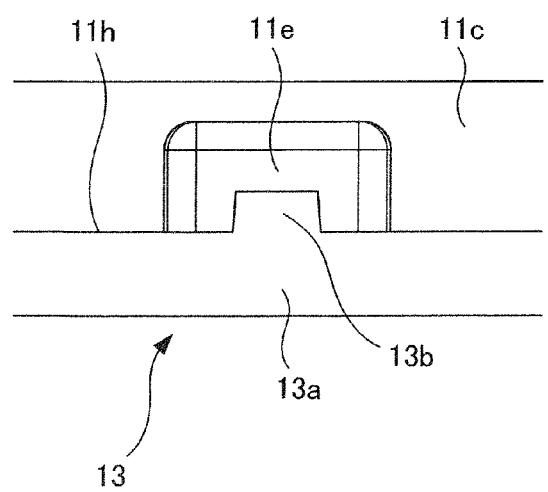
Figure 4:
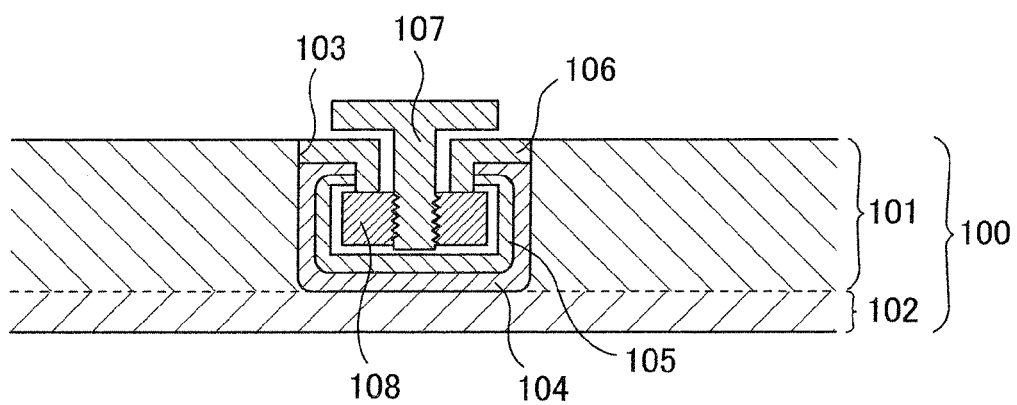
FIG. 4 is a cross-sectional view illustrating a case of using a buried, non-penetrated floating nut for a thin honeycomb sandwich panel.

As shown in FIG. 1, the penetrated floating nut according to Embodiment 1 of the present invention is arranged in a hole 22a formed in a honeycomb sandwich panel 22, which is an aircraft's floor, and a bolt 21 is screwed into and fastened to the penetrated floating nut. As a result, a plate body 23 (attaching target) can be fixed to the honeycomb sandwich panel 22. The penetrated floating nut according to Embodiment 1 of the present invention includes an upper-side retaining member (first retaining member) 11, a lower-side retaining member (second retaining member) 12 joined to the upper-side retaining member 11, and a nut 13 housed in the upper-side retaining member 11 and the lower-side retaining member 12.

The upper-side retaining member 11 is formed of an upper cylindrical section (first cylindrical section) 11b and an upper flange section (first flange section) 11a formed at one end portion thereof to extend radially outward. A portion of the upper cylindrical section 11b opposite the upper flange section 11a is a widened portion 11c having a larger diameter than the upper cylindrical section 11b. In an end surface 11h of the widened portion 11c, a locking recess 11e is formed for preventing rotation of the nut 13 during the fastening of the bolt. On the outer periphery of the widened portion 11c, an external thread 11d is formed for joining the upper-side retaining member 11 to the lower-side retaining member 12.

The lower-side retaining member 12 is formed of a lower cylindrical section (second cylindrical section) 12b and a lower flange section (second flange section) 12a formed at one end portion thereof to extend radially outward and inward. For the purpose of joining the lower-side retaining member 12 and the upper-side retaining member 11 to each other, an internal thread 12c which threadingly engages with the external thread 11d on the outer peripheral surface of the widened portion 11c of the upper-side retaining member 11 is formed on the inner peripheral surface of the lower cylindrical section 12b of the lower-side retaining member 12. Thus, the lower-side retaining member 12 is joined to the upper-side retaining member 11 as shown in FIG. 2.

Note that the external thread 11d is screwed into the internal thread 12c while leaving an internal space (A in FIG. 1). Specifically, an internal space is left between the lower flange section 12a and the end surface 11h of the widened portion 11c.

The nut 13 is housed in the upper cylindrical section 11b and the widened portion 11c with a gap therebetween. The bolt 21 is screwed in the nut 13 in such away as to penetrate therethrough, and a nut flange section (third flange section) 13a is formed at one end portion of the nut 13.

The nut flange section 13a is arranged in the above-mentioned internal space (A in FIG. 1). The nut flange section 13a is retained by the lower flange section 12a before the fastening of the bolt and, as shown also in FIGS. 3A to 3C, contacts the end surface 11h of the widened portion 11c after the fastening of the bolt. Specifically, the nut flange section 13a can be housed in the lower cylindrical section 12b of the lower-side retaining member 12 with a gap therebetween and contact the end surface of the first cylindrical section 11b of the upper-side retaining member 11.

After the fastening of the bolt, with the nut flange section 13a now in contact with the end surface 11h of the widened portion 11c, an upper surface 13c of the nut 13 is at a position lower than an upper surface 11g of the upper flange section 11a. In other words, the lower surface of the plate body 23 and the upper surface 13c of the nut 13 never come into contact with each other.

As already explained partly, the nut 13 includes rotation stopping means between itself and the first cylindrical section 11b of the upper-side retaining member 11 for stopping rotation of the nut 13 during the fastening of the bolt. Specifically, a locking protrusion 13b is formed on apart of the nut flange section 13a as rotation stopping means which engages with the locking recess 11e in the end surface 11h of the widened portion 11c. The locking protrusion 13b can move relative to the locking recess 11e in the vertical and horizontal directions (the axial direction and directions perpendicular thereto) within predetermined ranges of distance. During the fastening of the bolt, the locking protrusion 13b is locked in the locking recess 11e.

Note that a part of the locking protrusion 13b remains inserted in the locking recess 11e regardless of whether the bolt is fastened or yet to be fastened. Specifically, the locking protrusion 13b is not completely outside the locking recess 11e even before the fastening of the bolt, that is, even when the nut flange section 13a is retained by the lower flange section 12a.

In the inner wall of the widened portion 11c, an adhesive filling recess 11f is formed in which to keep an adhesive used to fixedly attach the bolt 21 after the fastening of the bolt.

Note that the upper-side retaining member 11 has been explained as including the widened portion 11c, but the widened portion 11c is not an essential component. In the case of forming the upper-side retaining member 11 without the widened portion 11c, the end surface of the upper cylindrical section 11b serves as the end surface 11h.

The structure of the penetrated floating nut according to Embodiment 1 of the present invention has been explained above. Next, the procedure of the fastening of the bolt using the penetrated floating nut according to Embodiment 1 of the present invention will be explained.

First, the lower flange section 12a of the lower-side retaining member 12 is brought into contact with a lower surface 22c of the honeycomb sandwich panel 22. Here, the nut 13 is already housed in the lower-side retaining member 12. Then, the lower-side retaining member 12 and the upper-side retaining member 11 are joined to each other by screwing the external thread 11d of the upper-side retaining member 11 into the internal thread 12c of the lower-side retaining member 12 such that the upper flange section 11a of the upper-side retaining member 11 contact an upper surface 22b of the honeycomb sandwich panel 22. As a result, the penetrated floating nut according to Embodiment 1 of the present invention is arranged in the hole 22a with the upper flange section 11a and the lower flange section 12a clamping the honeycomb sandwich panel 22.

Meanwhile, after screwing the external thread 11d of the upper-side retaining member 11 into the internal thread 12c of the lower-side retaining member 12, a sealant is introduced into a gap denoted by B in FIG. 1 between the penetrated floating nut according to Embodiment 1 of the present invention and the honeycomb sandwich panel 22 through one of holes 11i and air is discharged through the other hole 11i. As a result, the penetrated floating nut according to Embodiment 1 of the present invention can be fixed to the honeycomb sandwich panel 22.

Then, the plate body 23 is placed on the upper surface of the upper flange section 11a of the upper-side retaining member 11 and, in this state, the bolt 21 is inserted through a hole 23a in the plate body 23 with a washer 24 interposed therebetween and is then screwed into the nut 13 in the upper-side retaining member 11 and the lower-side retaining member 12. The bolt 21 screwed in the nut 13 penetrates through the lower cylindrical section 12b and projects to outside the penetrated floating nut.

When the bolt 21 is screwed into the nut 13, the locking recess 11e and the locking protrusion 13b can permit the nut 13 to follow misalignment of the bolt 21 within the predetermined ranges of distance while stopping the nut 13 from being rotated by the fastening of the bolt 21.

The bolt 21 fastened to the nut 13 as described above is capable of penetrating through the penetrated floating nut from the upper-side retaining member 11 side to the lower-side retaining member 12 side and also the nut 13 is buried in the honeycomb sandwich panel 22, thereby allowing secure fixing without requiring much space. Hence, reliable and compact fixing can be achieved.

In this embodiment, the aircraft's floor is the honeycomb sandwich panel 22 and the plate body 23 is fixed to the upper side thereof. However, the penetrated floating nut according to the present invention is not limited to such a case and is applicable to panels in general.

INDUSTRIAL APPLICABILITY

The present invention is preferable as a penetrated floating nut.

REFERENCE SIGNS LIST

11 UPPER-SIDE RETAINING MEMBER (FIRST RETAINING MEMBER)
11a UPPER FLANGE SECTION (FIRST FLANGE SECTION)
11b UPPER CYLINDRICAL SECTION (FIRST CYLINDRICAL SECTION)
11c WIDENED PORTION
11d EXTERNAL THREAD
11e LOCKING RECESS
11f ADHESIVE FILLING RECESS
11g UPPER SURFACE (OF UPPER FLANGE SECTION 11a)
11h END SURFACE (OF WIDENED PORTION 11c (UPPER CYLINDRICAL SECTION 11b))
12 LOWER-SIDE RETAINING MEMBER (SECOND RETAINING MEMBER)
12a LOWER FLANGE SECTION (SECOND FLANGE SECTION)
12b LOWER CYLINDRICAL SECTION (SECOND CYLINDRICAL SECTION)
12c INTERNAL THREAD
13 NUT

13a NUT FLANGE SECTION (THIRD FLANGE SECTION)
13b LOCKING PROTRUSION
13c UPPER SURFACE (OF NUT 13)
13d BOLT HOLE
21 BOLT
22 HONEYCOMB SANDWICH PANEL
22a HOLE (FORMED IN HONEYCOMB SANDWICH PANEL 22)
22b UPPER SURFACE (OF HONEYCOMB SANDWICH PANEL 22)
22c LOWER SURFACE (OF HONEYCOMB SANDWICH PANEL 22)
23 PLATE BODY
23a HOLE (IN PLATE BODY 23)
24 WASHER

The invention claimed is:

1. A penetrated floating nut, comprising:
a first retaining member including a cylindrical first cylindrical section and a first flange section provided at one end portion of the first cylindrical section;
a second retaining member including a cylindrical second cylindrical section and a second flange section provided at one end portion of the second cylindrical section, the second cylindrical section being joined to the first cylindrical section of the first retaining member; and
a nut housed in the first cylindrical section of the first retaining member with a gap therebetween and including a third flange section at one end portion of the nut and further including rotation stopping means between the nut and the first cylindrical section of the first retaining member, the third flange section being housed in the second cylindrical section of the second retaining member with a gap therebetween and being capable of contacting an end surface of the first cylindrical section of the first retaining member, wherein
the penetrated floating nut is formed such that a bolt is capable of being screwed into the nut in such a way as to penetrate and extend through an entirety of the penetrated floating nut from the first retaining member side to the second retaining member side.

2. The penetrated floating nut according to claim 1, wherein the rotation stopping means permits the nut to move relative to the first retaining member in an axial direction and directions perpendicular thereto within predetermined ranges.

3. The penetrated floating nut according to claim 1, wherein the second flange section is formed at one end of the second cylindrical section to extend radially inward and supports the third flange section when the bolt is not fastened.

4. The penetrated floating nut according to claim 1, wherein a recess in which to fill an adhesive is formed in an inner wall of the first cylindrical section.

5. The penetrated floating nut according to claim 1, wherein the second flange section is formed to be capable of contacting an outer surface of a panel.

6. The penetrated floating nut according to claim 5, wherein the first retaining member and the second retaining member are formed to be capable of clamping the panel with the first flange section and the second flange section with the first cylindrical section and the second cylindrical section screwed to each other.

* * * * *